Dec. 24, 1963     E. E. ROGERS     3,115,160
CONTROL VALVE
Filed Feb. 24, 1961     2 Sheets-Sheet 1
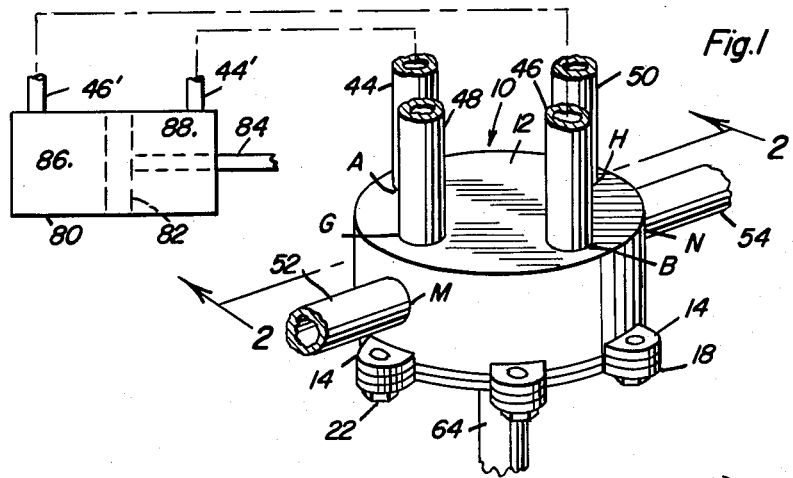
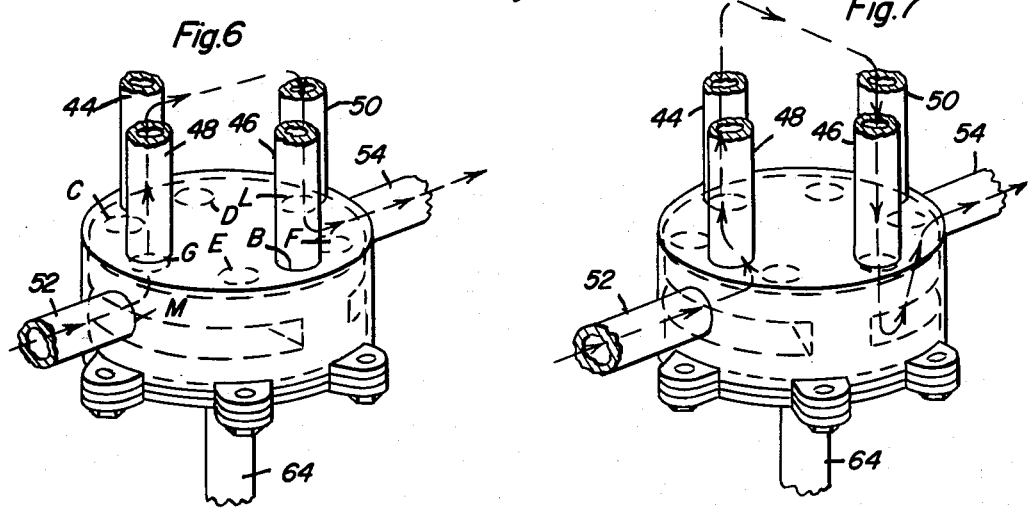
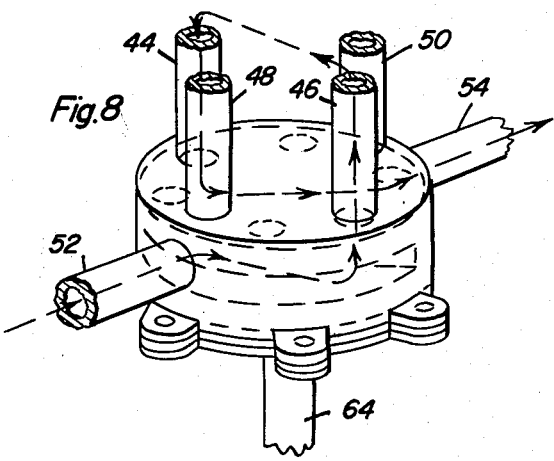
Emrie Eugene Rogers
INVENTOR.

Dec. 24, 1963 E. E. ROGERS 3,115,160
CONTROL VALVE
Filed Feb. 24, 1961 2 Sheets-Sheet 2
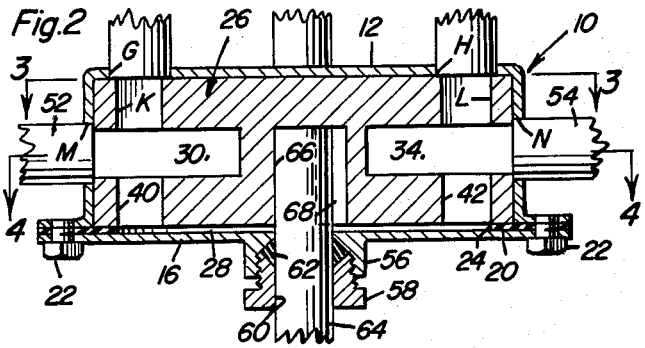
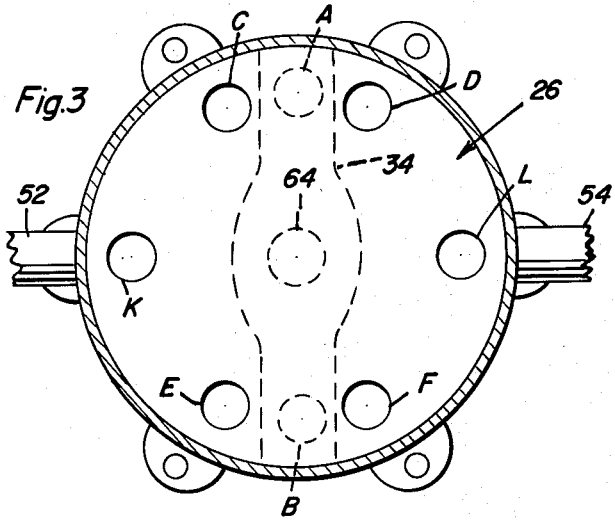
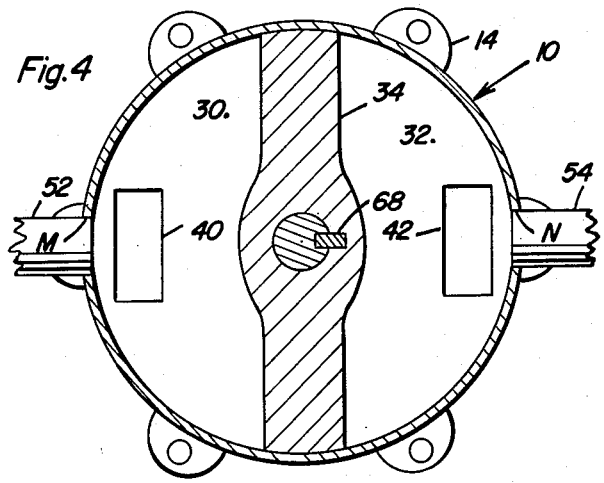
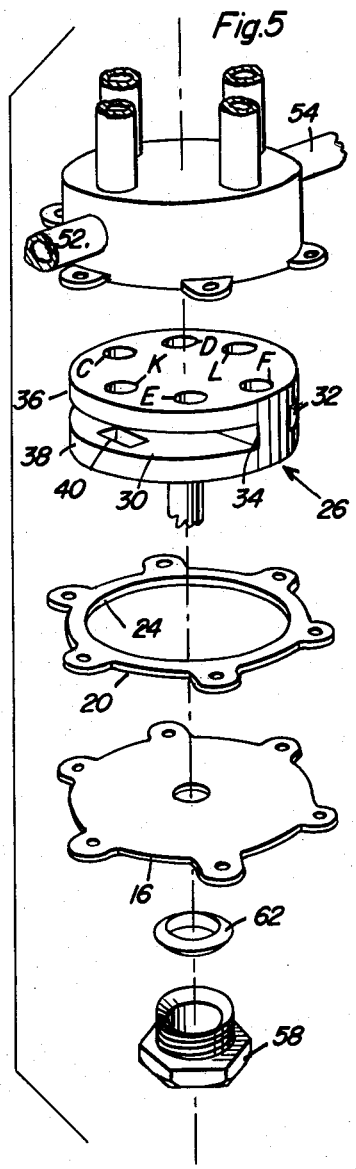
Emrie Eugene Rogers
INVENTOR.

3,115,160
CONTROL VALVE
Emrie Eugene Rogers, 1509 Ave. B, Huntsville, Tex.
Filed Feb. 24, 1961, Ser. No. 91,402
4 Claims. (Cl. 137—625.23)

This invention relates to a fluid control device, and particularly to a multiple valve.

It is an object of the invention to provide a valve for controlling the fluid pressure and exhaust to either side of a piston of a hydraulic motor whereby the motor can be reversed with an extremely small movement of the valve. This results in a very small amount of wear in the valve during use and thereby causing the valve to have a very long life span normally extending over a period of many years.

It is another object of the invention to provide a valve adapted for reversing a hydraulic motor which is extremely efficient in that it can be operated very rapidly and with a minimum of effort since it is only necessary to move the valve a very short distance.

It is another object of this invention to provide a multiple valve which will perform the function of four separate valves thereby providing a very economical replacement for the same.

Still another object of the invention is to provide a reversing valve for a double-acting hydraulic motor which opens a by-pass valve when in the neutral position.

Still another object of this invention is to provide a multiple valve which has parts that are automatically sealed by pressure within the valve.

It is yet another object of this invention to provide a multiple valve which is simple in design and therefore economical to manufacture, durable in use, and requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a preferred form of my invention;

FIGURE 2 is an enlarged cross sectional view taken substantially on the plane of line 2—2 in FIGURE 1;

FIGURE 3 is a cross sectional plan view taken substantially on the plane of line 3—3 of FIGURE 2;

FIGURE 4 is a cross sectional view taken substantially on the plane of line 4—4 in FIGURE 2;

FIGURE 5 is an exploded perspective view of the valve assembly;

FIGURE 6 is a perspective view illustrating the valve in a first position;

FIGURE 7 is a perspective view of the valve illustrating it in a second position; and FIGURE 8 is a perspective view illustrating the valve in a third position.

Referring to FIGURES 1 through 5, it can be seen that my multiple valve comprises a vertically extending cylindrical valve housing 10 having its upper end closed by an integral end partition 12 and having its lower end open. The lower end of the cylinder 10 has a plurality of radially extending ears 14 integrally formed therewith and equally spaced about the periphery of the lower edge as shown in FIGURE 1. The lower end of the cylinder 10 is closed by a cover 16 which is circular in outline and of the same size as the cylinder. The cover 16 also has a plurality of radially extending ears 18 formed integrally therewith so as to lie adjacent the ears 14. An annular gasket 20 of the same outer shape as the cover 16 is placed between the cover and the bottom of the cylinder 10. The gasket 20 is sealingly clamped between the cylinder and cover by means of a plurality of nuts 22 threaded into apertures in the ears 14. The inner portion of the gasket 20 is cutaway to form a circular opening 24.

Rotatably mounted within the housing 10 and snugly fitting the inner surface thereof is a generally cylindrical valve member 26. The valve member 26 is rotatably supported on the inner edge of the gasket 20 which slightly spaces the valve member from the cover 16 so as to form an annular space 28.

As shown in FIGURE 5, the central portion of the valve element 26 has two substantially semi-circular recesses 30 and 32 separated by a partition 34. The slots 30 and 32 in effect form two circular disks 36 and 38 integrally joined by the partition 34. The upper disk 36 has two vertically extending bores E and F extending therethrough adjacent one edge thereof and extending into the slots 30 and 32 on each side of the partition 34. Diametrically opposite the bores E and F are an identical pair of bores C and D which also extend into the slots 30 and 32 on each side of the partition 34. Spaced 90° from the point half-way between the bores C and D and half-way between the bores E and F are two diametrically opposed bores K and L also extending vertically into the slots 30 and 32. Extending through diametrically opposite sides of the disk 38 are two rectangular holes 40 and 42.

The cylindrical housing 10 has two diametrically opposite bores M and N extending through its vertical side wall in the central portion thereof. The top 12 of the cylinder 10 has four bores A, B, G and H, each spaced 90° from its adjacent bore and located adjacent the periphery of the top. All six of the bores each receive pipes which extend therein and are sealed thereto. The bores A, B, G, H, M and N are each connected to the pipes 44, 46, 48, 50, 52 and 54 respectively.

The valve cover 16 has an annular boss 56 integrally formed at its center portion and depending downwardly therefrom. The boss 56 has its inside surface threaded for receiving and mating with the exterior threads on the gasket compressing cap 58. The bottom portions of the recess in the boss 56 and the end of the cap 58 are formed so as to provide an annular cavity for the annular gasket 62. When the cap 58 is screwed into the boss 56, it compresses the gasket 62 against the outer surface of the circular shaft 64 so as to form an effective seal therefor. The shaft 64 extends vertically upward into a bore 66 in the valve member 26 and is drivingly connected thereto by a spline 68 which extends into slots in the end of the shaft 64 and in the inner surface of the bore 66. The shaft 64 provides an exterior means for rotating the valve member 26, and if desired may have a handle, not shown, secured thereto.

In operation, the port M is connected to a source of fluid pressure such as steam by means of a pipe 52 and the port N functions as an exhaust port in conjunction with the exhaust pipe 54. When fluid pressure enters the chambers 30 and 32, the rectangular ports 40 and 42 conduct such pressure to the annular space 28 so that the fluid pressure may urge the valve member 26 upwardly into tight sealing engagement with the top 12. To prevent flow between the passages 40 and 42, a narrow rib equal in thickness to the gasket 20 may be provided on the lower surface of the valve member 26 so as to extend diametrically thereacross just below the partition 34.

The ports A and B may be connected to the opposite ends of a cylinder containing a piston which divide the cylinder into two compartments and in conjunction therewith functions as a hydraulic motor. The pipes 44 and 46 may function as a connecting means between the motor and the ports A and B respectively. Ports G and H may be connected together to form a by-pass for the valve by means of the pipe sections 48 and 50. Alternatively the pipe 48 and 50 may be used to operate a second motor or some auxiliary apparatus.

As shown in FIGURES 3 and 6, the valve is in the neutral position and the ports G and H in the cover or top 12 are in direct alignment with the ports K and L in the valve member 26. This permits the valve to function as a by-pass valve and the fluid may flow from the inlet pipe 52 to the outlet pipe 54 by means of the port M, chamber 30, ports K and G, pipes 48 and 50, ports H, L and N, and into exhaust pipe 54. When the valve is in this neutral position, the upper surface of the disk 36 effectively seals the ports C, D, E and F. When the valve is in this neutral position, it may also serve to operate any apparatus connected between the pipes 48 and 50.

As viewed in FIGURE 3, when the valve member 26 is rotated by means of the shaft 64 a few degrees or very slightly in a clockwise direction, the ports C and A become vertically aligned and the ports F and B become vertically aligned as shown in FIGURE 6. This permits fluid to flow from the inlet pipe 52 to the outlet pipe 54 by means of port M, chamber 30, ports C and A, pipe 44, any apparatus connected between pipes 44 and 46, such as the chamber of the hydraulic motor, pipe 46, ports B and F, chamber 32, and passageway or port N into pipe 54. If a double-acting hydraulic motor is connected between the pipes 44 and 46, as explained above, then the motor will be operated in one direction.

If the valve member 26 is rotated very slightly or a few degrees from the neutral position shown in FIGURE 3, in a counterclockwise direction, then the pipes 52 and 54 will be connected in the manner illustrated in FIGURE 8. As illustrated in FIGURE 8, the ports E and B are vertically aligned and the ports A and D are vertically aligned. As shown in FIGURE 8, the pipes 52 and 54 are thus connected by means of port M, chamber 30, port E, port B, pipe 46, any auxiliary apparatus connected between the pipes 46 and 44 such as the opposite chambers of the hydraulic motor described above, the pipe 44, ports A and D, chamber 34, and port N into pipe 54. It can thus be seen, that if the above described hydraulic motor has its opposite chamber connected to the pipe 46, that the motor will be operated in an opposite direction from the direction it would be operated in if the valve were in the FIGURE 7 position, and the chamber of the motor connected to the pipe 44 would thus exhaust into the passageway or pipe 54 by means of chamber 34. It can thus be seen, that by oscillating the valve member 36 back and forth a very few degrees so as to ultimately align the ports C and D with the port A and the ports F and E with the port B, the double-acting hydraulic motor connected between the pipes 44 and 46 can be easily and very rapidly reversed.

It is to be noted that whenever the ports A and B are connected with any of the ports C, D, E and F, that the by-pass ports K and L are always closed by a portion of the upper surface of the valve member 26. The ports K and L are opened only when the valve member 26 is in the neutral position illustrated in FIGURE 3.

FIGURE 1 also illustrates how my control valve could be connected to the above described hydraulic motor. The motor may comprise a sealed cylinder 80 containing a reciprocating piston 82 which divides the interior of the cylinder into two sealed chambers 86 and 88. A rod 84 extends through a seal in one end of the cylinder and is fixed at one of its ends to the piston. When pressure is admitted to pipe 44 which is connected to pipe 44', fluid pressure in chamber 88 moves the piston 82 to the left and the fluid in chamber 86 is forced by the piston through pipes 46' and 46 to exhaust pipe 54. When fluid pressure is admitted by the valve to pipes 46 and 46', the motor and fluid move in the opposite direction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A valve comprising a housing having an inlet port, an outlet port, a return port and an exhaust port, a valve member movable in said housing and sealing said outlet and return ports when in a neutral position, a first pair of passages in said valve member, a second pair of passages in said valve member, said valve member being movable from said neutral position to a first position for connecting said first pair of passages to said outlet and return ports for opening a flow passage from said inlet to said outlet port and from said return port to said exhaust port, said valve member also being movable to a second position for connecting said second pair of passages to said outlet and return ports for reversing the flow through said outlet and return ports, said housing having a cylindrical chamber therein, said valve member being cylindrical and rotatable within said chamber, said inlet and exhaust ports being in opposite sides of the cylindrical wall of said housing and said outlet and return ports being in diametrically opposite sides of an end wall of said cylindrical chamber, said valve member having semi-circular slots in opposite sides thereof for communication with said inlet and exhaust ports and said first and second pairs of passages each comprising two diametrically opposed bores each communicating with one of said slots, said pairs of passages extending upwardly from said slots, said cylindrical valve member being spaced at its lower end from an end of said housing to form a chamber, ports extending downwardly from said slots to said chamber for admitting pressure thereto from said inlet port whereby the valve member will be urged upwardly into sealing engagement with an upper end of said housing.

2. A valve comprising a housing having an inlet port, an outlet port, a return port and an exhaust port, a valve member movable in said housing and sealing said outlet and return ports when in a neutral position, a first pair of passages in said valve member, a second pair of passages in said valve member, all said passages being spaced from one another and extending entirely through said member, said valve member being movable from said neutral position to a first position for connecting said first pair of passages to said outlet and return ports for opening a flow passage from said inlet to said outlet port and from said return port to said exhaust port, said valve member also being movable to a second position for connecting said second pair of passages to said outlet and return ports for reversing the flow through said outlet and return ports, conduit means secured to the housing overlying the return and outlet ports providing a fluid connection to said flow passage, said housing having a cylindrical chamber therein, said valve member being cylindrical and rotatable within said chamber, said valve member having a third pair of diametrically opposed passages which are aligned with two by-pass passages in said housing when said valve member is in said neutral position to open a flow passage from said inlet port to one of said by-pass passages and from the other by-pass passage to said exhaust port, and second conduit means secured to the housing overlying said by-pass passages providing a fluid connection to said last defined flow passage, said by-pass passages being closed by said valve member when said valve member is in said first and second positions.

3. A valve comprising a housing having an inlet port, an outlet port, a return port and an exhaust port, a valve member movable in said housing and sealing said outlet and return ports when in a neutral position, a first pair of passages in said valve member, a second pair of passages in said valve member, said valve member being movable from said neutral position to a first position for connecting said first pair of passages to said outlet and return ports for opening a flow passage from said inlet to said outlet port and from said return port to said exhaust port, said valve member also being movable to a second position for connecting said second pair of passages to said outlet and return ports for reversing the flow through said outlet and return ports, conduit means secured to the housing overlying the return and outlet ports providing a fluid connection to said flow passage, said housing having a cylindrical chamber therein, said valve member being cylindrical and rotatable within said chamber, said inlet and exhaust ports being in opposite sides of the cylindrical wall of said housing and said outlet and return ports being in diametrically opposite sides of an end wall of said cylindrical chamber, said valve member having semi-circular slots in opposite sides thereof for communication with said inlet and exhaust ports and said first and second pairs of passages each comprising two diametrically opposed bores each communicating with one of said slots, said valve member having a third pair of diametrically opposed passages which are aligned with two by-pass passages in said housing when said valve member is in said neutral position to open a flow passage from said inlet ports to one of said by-pass passages and from the other by-pass passage to said exhaust port, and a second conduit means secured to the housing overlying said by-pass passages providing a fluid connection to said last defined flow passage, said by-pass passage being closed by said valve member when said valve member is in said first and second positions.

4. A valve as defined in claim 3 wherein the lower end of said housing is sealed thereto by an annular gasket, said gasket overlapping an edge of said valve member and separating said valve member and said lower end for causing said chamber.

References Cited in the file of this patent

UNITED STATES PATENTS

| | | |
|---|---|---|
| 1,055,781 | Mitchell et al. | Mar. 11, 1913 |
| 1,458,355 | Nelson | Jan. 12, 1923 |
| 1,971,187 | Jacobson et al. | Aug. 21, 1934 |
| 2,696,219 | Barksdale | Dec. 7, 1954 |
| 2,907,349 | White | Oct. 6, 1959 |
| 2,952,243 | Dunning | Sept. 13, 1960 |